A. S. VOGT.
PROTECTIVE COVERING FOR SCALE PITS.
APPLICATION FILED JULY 16, 1917.
1,258,725.
Patented Mar. 12, 1918.
3 SHEETS—SHEET 1.
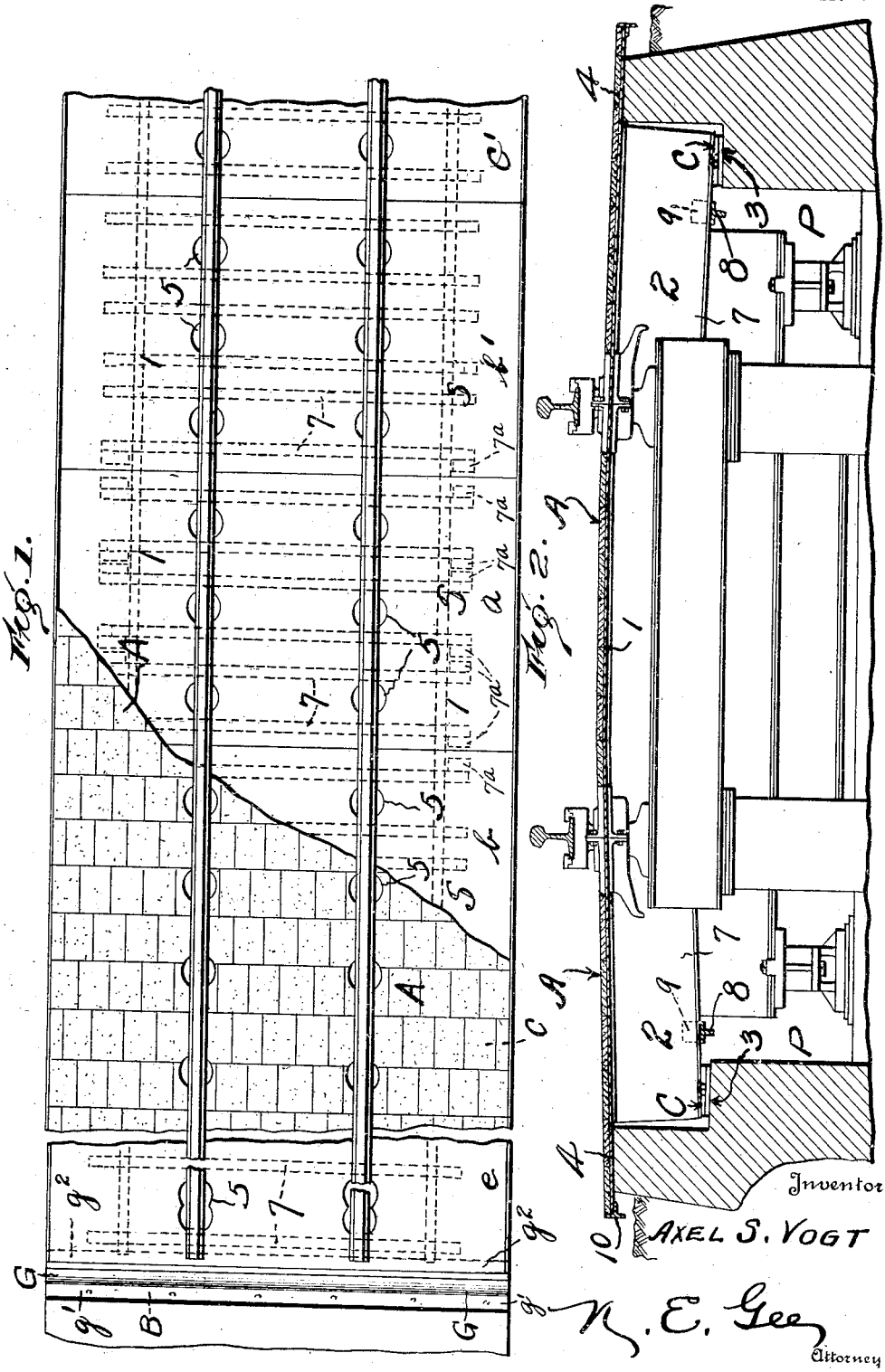
Inventor
AXEL S. VOGT
N. E. Gee
Attorney A. S. VOGT.
PROTECTIVE COVERING FOR SCALE PITS.
APPLICATION FILED JULY 16, 1917.
1,258,725.
Patented Mar. 12, 1918.
3 SHEETS—SHEET 2.
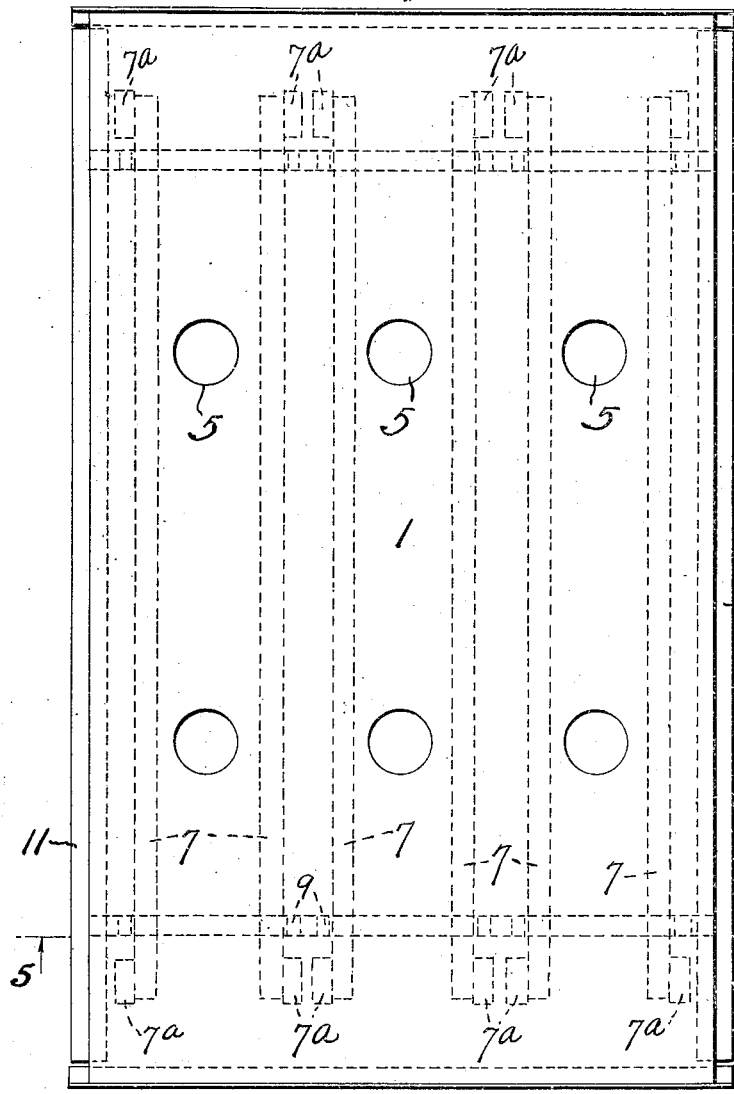
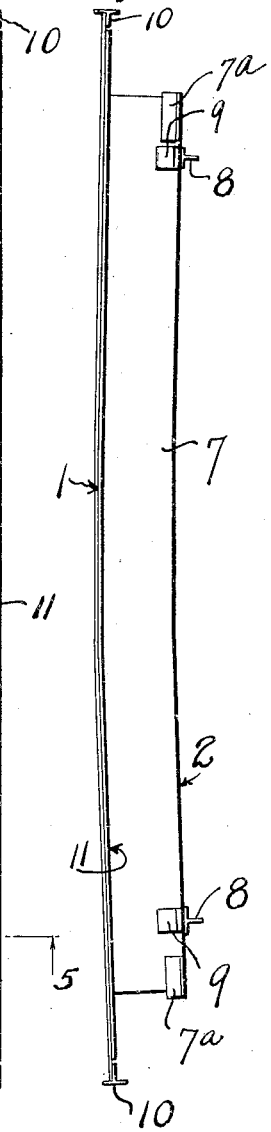
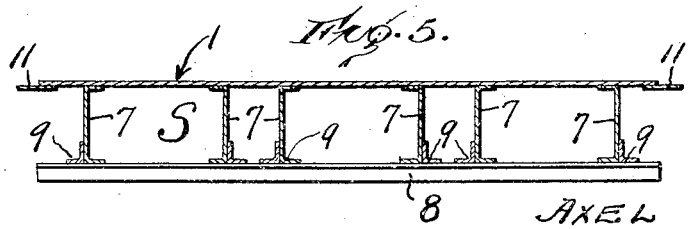
Inventor
AXEL S. VOGT
By N. E. Gee
Attorney A. S. VOGT.
PROTECTIVE COVERING FOR SCALE PITS.
APPLICATION FILED JULY 16, 1917.
1,258,725.
Patented Mar. 12, 1918.
3 SHEETS—SHEET 3.
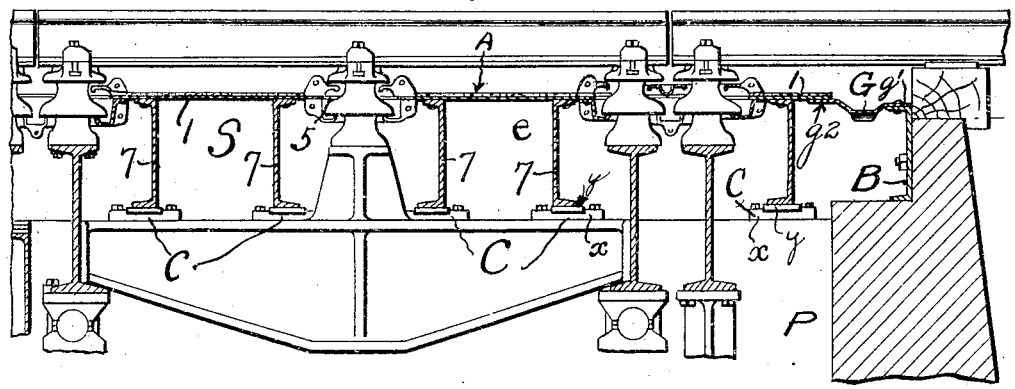
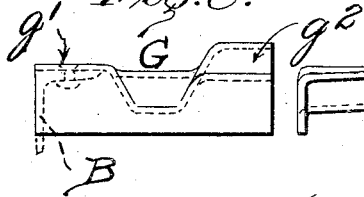
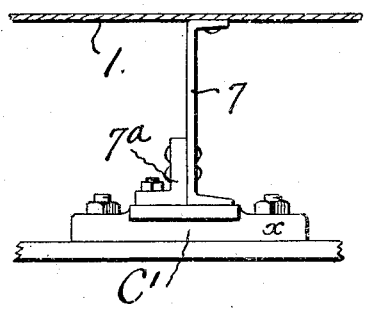
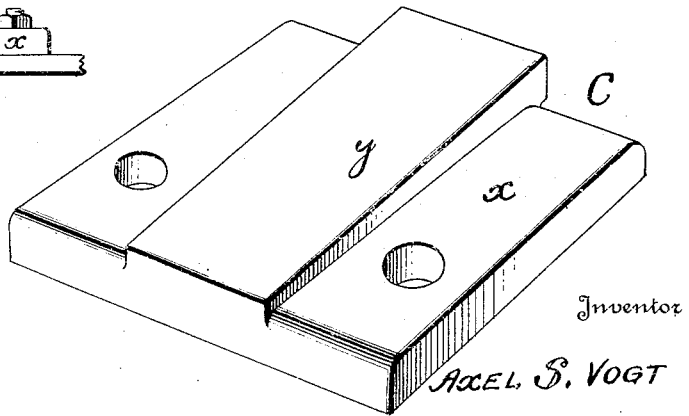
Inventor
Axel S. Vogt
By N. E. Gee
Attorney

UNITED STATES PATENT OFFICE.

AXEL S. VOGT, OF ALTOONA, PENNSYLVANIA.

PROTECTIVE COVERING FOR SCALE-PITS.

1,258,725.  Specification of Letters Patent.  Patented Mar. 12, 1918.

Application filed July 16, 1917. Serial No. 180,852.

*To all whom it may concern:*

Be it known that I, AXEL S. VOGT, a subject of the King of Sweden, residing at Altoona, in the county of Blair and State of Pennsylvania, have invented certain new and useful Improvements in Protective Coverings for Scale-Pits, of which the following is a specification.

This invention relates to track scales and more particularly to a novel scale deck or covering for scale pits.

To this end, the invention contemplates a novel construction which will effectively house and protect the scale mechanism in the pit, and at the same time permit of the necessary expansion and contraction of the metal in the deck without interfering with the scale mechanism. That is to say, it is proposed to provide a protective covering or deck for scale pits which is susceptible of a change in dimension as brought about by the expansion and contraction of metal in the deck, and to also provide novel means for not only protecting the said metal of the deck against undue expansion and contraction under varying temperature conditions, but at the same time, maintain safe temperature conditions in the pit.

A further object of the invention is to provide a scale deck which will also effectively shed water, and in this connection, it is proposed to provide a novel arrangement between the end of the scale deck and the main trackway whereby water will be prevented from entering the scale pit at this point.

A further object of the invention is to provide a strong and relatively light sectional pit cover or deck which may be easily handled for purposes of inspection, transportation, or repair, and which is durable and effective in use.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a plan view of a portion of the pit cover showing several sections thereof, and also showing the insulating covering which is provided for all of the sections to preserve the proper temperature conditions in the pit.

Fig. 2 is a vertical cross-sectional view of one of the sections of the pit cover.

Fig. 3 is a detail plan view of one of the cover sections with the insulating cover removed.

Fig. 4 is a side elevation thereof.

Fig. 5 is a cross-sectional view thereof taken on the line 5—5 of Fig. 3.

Fig. 6 is a detail vertical sectional view of the end, of the scale deck showing the gutter arrangement for carrying water from the end section thereof.

Figs. 7 and 8 are respectively side and end views of the gutter shown in Fig. 6.

Fig. 9 is a perspective view of one of the chairs on which the beams of the deck sections slide.

Fig. 10 is a detail elevation showing how the center section is anchored.

Similar reference characters designate corresponding parts throughout the several figures of the drawings.

In carrying the present invention into effect, it is proposed, as previously indicated, to construct the present pit cover in sections. Accordingly, as will be observed from Fig. 1, the present pit cover essentially comprises a plurality of matching cover sections each designated in their entirety as S, and which may be utilized in any number according to the size of the scale. However, in the particular scale shown nine sections are employed but on account of limited space and the fact that all of the sections have the same general structural features, only certain ones are shown such for instance as the center section $a$, right and left side sections $b'$ and $b$ respectively, and portions of the adjoining sections $c$ and $c'$, and one end section $e$. These several sections are so mounted as to take care of the inevitable expansion and contraction of the metal therein, as will presently appear, notwithstanding that the invention contemplates a novel insulating covering therefor. That is to say, while these sections are protected to prevent excess expansion or contraction it is also proposed to provide to take care of what little there may be to amply insure safe operating conditions for the scale.

By way of describing the features common to the several sections it may be noted that each essentially comprises a sheet metal body portion 1, and suitable reinforcing means designated generally as 2 and constituting a base which is supported upon a suitable ledge or shoulder 3 formed in the opposite side walls of the pit or vault designated generally as P, or its equivalent. The said sheet metal body portion 1 extends over the upper sides 4 of the walls of the pit, to provide a sealed joint therefor, and is provided with a plurality of rail support openings 5, through which the rail supports, having their own means for excluding water and other foreign matter, project. With further reference to the body 1, it will be observed that the same is higher in the middle than at each end to provide an effective water shed, and in order to impart the desired strength and rigidity thereto, the reinforcing means 2 is preferably arranged and distributed as shown in Figs. 3, 4, and 5 of the drawings. That is to say, the sheet metal body 1 is provided at its under side with a plurality of depending channel beams 7, which are preferably arranged in groups or pairs at the intermediate portion of the section, while only a single channel bar is utilized adjacent each end thereof. These channel beams which carry the deck plates are especially designed to be strong enough to protect the scale mechanism housed in the scale pit in the case of the derailment of a locomotive or car, and furthermore, said channel beams are because of the previously referred to water-shed characteristic of the cover section, slightly arched at their intermediate portion, as will be seen from Fig. 4, and are securely connected and spaced at their lower ends by means of the longitudinal braces or tie rods 8, which, as shown in Fig. 4, are of substantially T-shaped formation. To further assist in securing the tie rods 8 to the channel beams 7, the angle plates 9 may be utilized, as shown more clearly in Fig. 5.

In connection with the sheet metal body 1, it may also be observed that each lateral edge thereof has secured thereto a T-iron 10, one portion of which forms a guard edge for the cork insulating covering 6, which T-iron at the same time materially reinforces the entire lateral edge of each section. Also, to provide for accurately matching the meeting edges of the adjoining sections, and thereby provide a close fitting joint, the body sheets of alternate sections carry at their under side adjacent each matching edge portion, a projecting splice iron 11, which fits beneath the adjacent section to provide the character of joint referred to. These projecting splice iron members 11 which extend beyond the edges of alternate sections of the deck also operate to provide a tight joint at all times between the several sections when the same expand or contract due to temperature changes.

The foregoing sets forth the general structural characteristics of each of the deck sections S, whereby they are capable of withstanding the unusual conditions to which they are subject, and which render them of such a character that they may be easily handled for shipment, emplacement, removal and the like. However, as previously indicated, it is also the purpose of the present invention to provide a scale deck, composed of a plurality of sections which are so arranged that the expansion and contraction of the metal therein may be taken care of and distributed in the most effective manner. Accordingly, to this end it is proposed to employ a protective cover for the exposed surfaces of the deck, and also arrange and support these sections whereby certain ones thereof will be able to slide or move under the changing temperature conditions.

Therefore, for the purpose of providing desired protection and insulation of the exposed surface of the scale deck to prevent undue expansion or contraction of the deck plates, and at the same time preserve a safe temperature in the pit under extreme temperature conditions, said sheet metal body 1 of each scale section is provided on its exposed face with a suitable insulating covering designated generally as A. This covering may be of any well known and available insulating material, but for all practical purposes, blocks or squares of cork may be successfully employed as indicated in Figs. 1 and 2, not only because of the insulating properties of cork and the facility with which it may be obtained commercially, but also because of its water resisting nature. And, in order to take care of such expansion and contraction, of the metal in the deck as may occur it is proposed to anchor certain of the deck sections, while the others are permitted to have a relatively free movement on their support. That is to say, it is proposed to securely fasten or anchor the channel beam members 7 of the center section $a$, and also fasten the adjacent edges of the right and left side sections $b'$ and $b$ respectively, whereby the expansion and contraction of the deck will take place between the middle of the deck and the end portions thereof which have a sealed slip joint connection with the main trackway as will presently appear.

In order to carry into effect the feature of the invention which contemplates taking care of the movement of the sections due to the conditions stated, it is therefore proposed to mount all of the channel beams 7 upon suitable chairs C, of the type for instance, shown in Fig. 9 of the drawings. That is to say, it is proposed to mount the opposite end portions of the beams 7 of each section upon suitable chairs which are rigidly secured to the deck support, which may be the ledge 3 of the side walls of the vault or pit in the case of the end sections of the deck, or an equivalent beam or the like in the case of one of the center sections of the deck. The chair shown in Fig. 9 of the drawing is one of the type that is employed to support the sliding or movable sections of the deck, and essentially comprises an attaching base $x$ and a raised bearing seat $v$ whose upper surface is inclined to conform to the curvature of the end of each channel beam. Practically the same type of chair is shown in Fig. 10 of the drawings for supporting the beams of the stationary center section $a$ of the scale deck, the only difference being that the chair in this figure is constructed to have bolted thereto a suitable anchor plate.

To provide for making the center section $a$ of the deck stationary, the ends of the channel beams 7 of this section rest upon the special chairs C' and are provided with the angular anchoring plates $7^a$ shown in Figs. 3, 4, and 10 of the drawings. From said Fig. 3 which shows the center section of the scale deck, it will be apparent that it is proposed to provide each of the beams 7 with an anchor plate $7^a$. This may also be observed from Fig. 1 wherein the beams are shown in dotted lines, and furthermore it will be seen that the beams 7 of the adjoining left and right side sections $b$ and $b'$ are also provided with anchoring plates $7^a$.

Another novel feature of the invention resides in providing a novel connection between each of the end sections $e$ of the scale and the main road bed. That is to say, it is proposed to provide a structure at this point which will not only permit of the movement of the deck as it expands and contracts but also will shed water. Therefore this structure is preferably in the form of a gutter or trough for carrying off water which is likely to enter at this point. Fig. 6 of the drawings shows this novel gutter G which essentially consists of a trough portion having the opposite flanged portions $g'$ and $g^2$, the former being rigidly secured by suitable fastening means to the beam B of the road bed structure, while the latter engages beneath the underside of the edge portion of the metal body or deck plate 1 of the section $e$ to provide a slip joint. The provision of this slip joint connection between the gutter G and the edge of the end section $e$, effectively excludes water from the scale pit at the point between the end of the scale deck and road bed, and carries off water which would otherwise enter the scale pit. Furthermore, the slip joint connection referred to forms a part of the general scheme of the invention which contemplates taking care of the expansion and contraction of the deck under changing temperature conditions.

Without further description it is thought that the many features and advantages of the invention will be readily apparent, and it will of course be understood that minor changes in the form, proportion and other details of construction may be resorted to without departing from the spirit of the invention or scope of the appended claims.

I claim:

1. A deck for scale pits including a plurality of sections lying in the same horizontal plane, means for anchoring the intermediate sections, means for slidably supporting the sections at each side of said anchored intermediate sections, and closure means between the edge portions of the extreme end sections and the adjacent portion of the pit.

2. A deck for scale pits including a plurality of relatively flat rectangular sections, lying in the same plane, means for anchoring the intermediate sections of the deck, and means for slidably supporting the sections at each side of said intermediate sections.

3. A deck for scale pits including, in combination with a support, a plurality of matched sections lying in the same horizontal plane and having reinforcing elements at the under side thereof, means for anchoring the reinforcing elements of the intermediate sections to said support, and means for slidably supporting the reinforcing elements of the other sections on said support.

4. A scale deck including in combination with a support, a plurality of matched sections having reinforcing elements, means for anchoring the reinforcing elements of certain of said sections to said support, and chairs fixed to said support and slidably supporting the reinforcing elements of the other sections.

5. In a track scale construction, the combination with the main trackway, of a scale deck including a plurality of sections having matching edge portions, means for anchoring certain of said sections, and chairs for supporting the sections of said deck which are not anchored whereby they may move under changing temperature conditions.

6. In a track scale construction, the combination with the main trackway, of a scale deck including a plurality of matched sections, means for supporting the said sections of the scale deck whereby changes in dimension caused by temperature conditions may be taken care of, and means arranged between each end of the scale deck and the main road bed and providing a water-tight joint therebetween.

7. In a track scale construction, the combination with the main trackway, of a scale pit, a cover for said pit including a plurality of matched sections, means for supporting said sections whereby they may move under changing temperature conditions, and gutter means arranged between each end of the cover and the main trackway and having a slip joint connection with said cover.

8. In a track scale construction, the combination with a main trackway, of a sectional scale deck, means for anchoring the center section of said deck, means for movably supporting the sections of the deck on each side of the center section, and closure means between each end section of the deck and the road bed and having a slidable engagement with the former.

9. In a track scale construction, the combination with the fixed ends of a main trackway, of a scale deck having its end sections spaced from the fixed ends of the main trackway, and means carried by the said fixed ends of the latter and having a slip joint connection with the scale deck for providing a water-tight joint therebetween.

10. A protective covering for scale pits including a metallic cover section adapted to span the pit, and a cork facing secured thereto.

11. A protective covering for scale pits including a plurality of transversely arched cover sections each having an exposed heat insulating and anti-slipping facing.

12. A protective covering for scale pits including a plurality of matching sections, each including a metallic reinforced body element, and an external insulating covering.

13. A protective covering for scale pits including a metallic reinforced body element including a plurality of arched sections each having matching edge portions, and an external insulating covering for all the sections.

14. A protective cover for scale pits including a plurality of arched sections each including a reinforced metallic body sheet having a plurality of rail support openings therein, a plurality of transversely disposed reinforcing beams, and tie rods connecting the same.

15. A protective cover for scale pits including a plurality of transversely arched sections, each section including metallic body sheet having an external insulating covering and a plurality of rail supporting openings, a plurality of transversely disposed reinforcing and supporting beams carried by the under side of the metallic body sheet, and tie rods disposed at right angles to the beams and connecting the same.

16. A protective cover for scale pits including a plurality of arched sections, each section including a metallic body sheet having an external insulating covering and a plurality of rail supporting openings, a plurality of transversely disposed reinforcing and supporting beams carried by the under side of the metallic body sheet, tie rods disposed at right angles to the beams and connecting the same, and means at the edge of each section for protecting the edge of the insulating covering.

In testimony whereof I hereunto affix my signature in presence of two witnesses.

AXEL S. VOGT.

Witnesses:
N. E. GEE,
S. P. LLOYD.